United States Patent
Davis et al.

(10) Patent No.: US 12,111,420 B2
(45) Date of Patent: Oct. 8, 2024

(54) MIRROR WITH POLARIZING BEAM SPLITTER FOR LIDAR SYSTEM

(71) Applicant: LG INNOTEK CO., LTD., Seoul (KR)

(72) Inventors: Ryan T. Davis, Woodside, CA (US); Mohamed S. Seghilani, Sunnyvale, CA (US); Richard S. D'Alo, San Jose, CA (US)

(73) Assignee: LG INNOTEK CO., LTD., Seoul (KR)

( * ) Notice: Subject to any disclaimer, the term of this patent is extended or adjusted under 35 U.S.C. 154(b) by 656 days.

(21) Appl. No.: 16/942,028

(22) Filed: Jul. 29, 2020

(65) Prior Publication Data

US 2022/0035002 A1 Feb. 3, 2022

(51) Int. Cl.
*G01C 3/08* (2006.01)
*G01S 7/481* (2006.01)
*G02B 27/10* (2006.01)
*G01S 17/93* (2020.01)

(52) U.S. Cl.
CPC .............. *G01S 7/481* (2013.01); *G02B 27/10* (2013.01); *G01S 17/93* (2013.01)

(58) Field of Classification Search
CPC .................. G01S 7/481; G02B 27/10
See application file for complete search history.

(56) References Cited

U.S. PATENT DOCUMENTS

| | | | |
|---|---|---|---|
| 7,731,366 B2 * | 6/2010 | Aastuen | G02B 27/1026 359/489.14 |
| 7,894,044 B1 | 2/2011 | Sullivan | |
| 9,791,555 B2 | 10/2017 | Zhu | |
| 9,874,635 B1 | 1/2018 | Eichenholz et al. | |
| 10,444,356 B2 | 10/2019 | Wu et al. | |

(Continued)

FOREIGN PATENT DOCUMENTS

| | | | | |
|---|---|---|---|---|
| CN | 101147095 A | * | 3/2008 | ......... G02B 27/1026 |
| CN | 205067877 U | * | 3/2016 | ............. G02B 27/10 |

(Continued)

OTHER PUBLICATIONS

Machine translation of KR-100208659-B1 (Year: 1999).*

(Continued)

*Primary Examiner* — Mark Hellner
(74) *Attorney, Agent, or Firm* — Birch, Stewart, Kolasch & Birch, LLP

(57) ABSTRACT

Systems, methods, and computer-readable media are disclosed for systems and methods for improved LIDAR return light capture efficiency. One example method may include emitting, by an emitter, a first light pulse in a first path. The example method may also include transmitting, by a polarizing beam splitter in the first path and aligned with an aperture of a reflective element, a portion of the first light pulse, wherein the reflective element is disposed of in the first path. The example method may also include reflecting, by a reflective surface of the reflective element, a second light pulse in a second path, the second light pulse including a return pulse based on the first light pulse being reflected from an object. The example method may also include detecting, by a detector, the detector disposed in the second path of the second light pulse.

20 Claims, 7 Drawing Sheets

(56) References Cited

U.S. PATENT DOCUMENTS

| | | | |
|---|---|---|---|
| 2010/0118394 A1* | 5/2010 | Hecker | G02B 21/06 |
| | | | 359/385 |
| 2012/0187283 A1 | 7/2012 | Yamada et al. | |
| 2014/0078488 A1 | 3/2014 | Hoashi | |
| 2018/0267151 A1 | 9/2018 | Hall et al. | |
| 2018/0269646 A1 | 9/2018 | Welford et al. | |
| 2018/0284241 A1 | 10/2018 | Campbell et al. | |
| 2018/0284280 A1* | 10/2018 | Eichenholz | G01S 7/4816 |
| 2018/0299534 A1 | 10/2018 | LaChapelle et al. | |
| 2019/0107606 A1 | 4/2019 | Russell et al. | |
| 2019/0113622 A1 | 4/2019 | Wu et al. | |
| 2019/0148084 A1 | 5/2019 | Hansson et al. | |
| 2019/0154804 A1 | 5/2019 | Eichenholz | |
| 2019/0293766 A1 | 9/2019 | Madutescu | |
| 2019/0318177 A1* | 10/2019 | Steinberg | G01S 7/4873 |
| 2020/0049492 A1 | 2/2020 | Kim et al. | |
| 2020/0124711 A1 | 4/2020 | Rezk et al. | |
| 2021/0325520 A1* | 10/2021 | Cai | B32B 33/00 |

FOREIGN PATENT DOCUMENTS

| | | | | |
|---|---|---|---|---|
| KR | 100208659 B1 * | 7/1999 | | G02B 5/20 |
| KR | 100238802 B1 * | 1/2000 | | G02B 27/283 |
| RU | 2191406 C1 | 10/2002 | | |
| RU | 2270523 C1 | 2/2006 | | |
| WO | 2019038062 A1 | 2/2019 | | |
| WO | 2019106429 A3 | 6/2019 | | |

OTHER PUBLICATIONS

Machine translation of KR-100238802-B1 (Year: 2000).*
Machine translation of CN-101147095-A (Year: 2008).*
International Search Report and Written Opinion of the International Searching Authority directed to related International Patent Application No. PCT/US2021/043702, mailed Nov. 17, 2021; 12 pages.
N. Page et al. "Efficient Coupling of Lasers to Telescopes with Obscuration" in NASA Tech Briefs, Jan. 2003, pp. 23-24, United States.
R.R. Sarwadnya et al. "LiDar Mapping: A Remote Sensing Technology," in International Journal of Science and Research, Dec. 2014, pp. 162-164, vol. 3, issue No. 12, Maharashtra, India.

* cited by examiner

MIRROR WITH POLARIZING BEAM SPLITTER FOR LIDAR SYSTEM

BACKGROUND

In some conventional LIDAR systems (for example, in coaxial, monostatic vehicle LIDAR systems), a mirror may be disposed of in between one or more emitter devices (for example, laser diodes) and one or more detector devices (for example, photodetectors). The mirror may contain an opening that may allow light emitted from an emitter device to pass through the mirror, wherein the light may then travel into an environment of the LIDAR system, reflect back from an object, and reflect off of the mirror and towards a detector device. However, the existence of the opening to allow emitted light to transmit through the mirror may also allow some of the returning light to pass through the opening in the mirror instead of reflecting towards to the detector device. Accordingly, this light passing through the opening will not be detected by the detector device, and the information contained in this light will not be processed by the LIDAR system.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems and methods for an optical switch (for clarity sake, the "optical switch" may be the "reflective element" that may include a polarizing beam splitter portion as described herein) using a polarizing beam splitter that provides improved LIDAR return light capture efficiency. In particular, the systems and methods disclosed herein may relate to maximizing the percentage of return light that is received at a detector of a LIDAR system relative to the amount of light that is transmitted by an emitter of the LIDAR system. Return light may refer to light that has been emitted by a LIDAR system, reflected from an object in the environment of the LIDAR system, and has returned back to the LIDAR system. In some LIDAR system configurations, a mirror may be used to reflect the return light towards the detector (for example, in a coaxial, monostatic LIDAR system). However, in such configurations, the mirror may also be disposed of in the path of the light being emitted from the emitter device, and may block the emitted light from reaching the environment. Thus, such systems may include openings in the mirror to allow the emitted light to pass through the mirror and into the environment, while still having the mirror in place to reflect most of the return light to the detector. However, given that the mirror has an opening, some of the return light may inevitably pass through the opening instead of being reflected by the mirror towards the detector. This may result in inefficiencies in the LIDAR system as some of the return light may be lost and not received by the detector.

Figure 1:
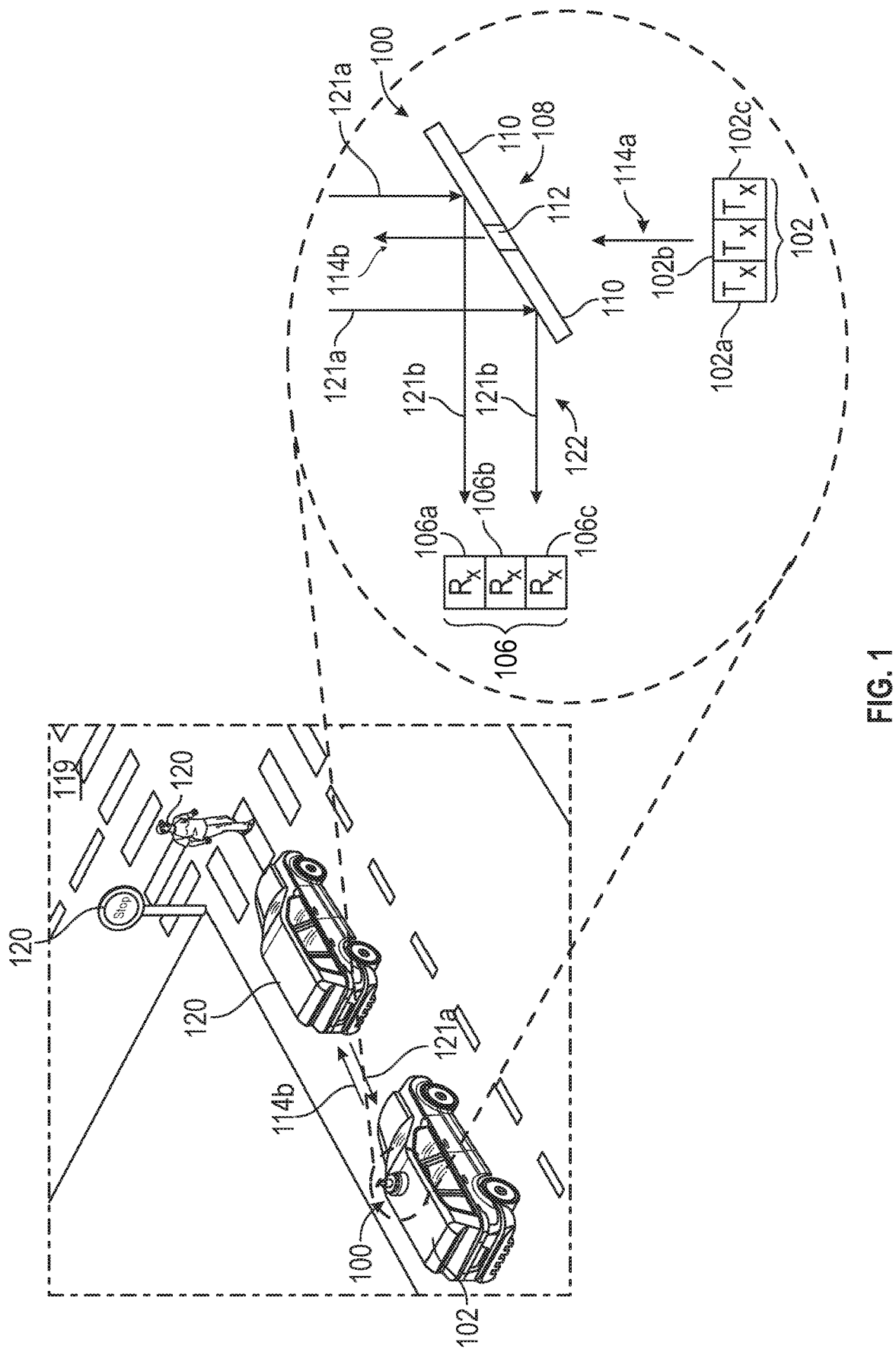
FIG. 1 depicts an example schematic diagram of an optical switch system, in accordance with one or more example embodiments of the disclosure.

In some embodiments, the systems and methods described herein may serve to mitigate this loss of return light through the opening in the mirror. To accomplish this, a polarizing beam splitter may be used in the opening of the mirror. The addition of the polarizing beam splitter where the opening would normally be may serve to reflect towards the detector at least a portion of the return light that would otherwise pass through the opening. This may be because the polarizing beam splitter may be configured to reflect light in particular polarization states (or at least a certain percentage of light in a particular polarization state. For example, the polarizing beam splitter may be configured to reflect 95% of p polarized light and transmit 5% of p polarized light), so the polarizing beam splitter may effectively serve as an extension of the mirror for light in that particular polarization state. As an example, the polarizing beam splitter may be configured to reflect p polarized light and may be configured to transmit s polarized light. Accordingly, and continuing this same example, the emitter of the LIDAR system may emit s polarized light, so that the emitted light may pass through the polarizing beam splitter and into the environment. Additionally, while the above example describes a polarizing beam splitter that may primarily reflect p polarized light, in some instances, the polarizing beam splitter may also be configured to primarily reflect s polarized light as well. This configuration may be useful if the location of the emitter and detector devices as depicted in FIG. 1 are swapped. That is, in such instances, it would be desirable for the polarizing beam splitter to reflect s polarizing light so that light emitted from the emitter device would be reflected by the polarizing beam splitter and into the environment (that is, assuming that the emitter device emits s polarized light). Thus, the configuration of the emitter devices, detector devices, and reflective element (including the polarizing beam splitter) as described herein should not be taken as fixed.

In some instances, once light has been transmitted through (has passed through) the polarizing beam splitter, it may traverse the environment until it reflects from an object and back towards the LIDAR system. The return light may include light of mixed polarization states. This may be because surfaces of objects that are encountered in the environment may have diffuse and specular reflection components, where the diffuse component may depolarize incident linearly polarized light (either purely s or p polarization) into a polarization state that may be a mixture of s and p polarization. Retro reflectors also act to change the incident linear polarization state to arbitrary elliptical polarization after reflection (addition of s or p polarization with phase offset between field s and p components). For example, the return light may include both p polarized light and s polarized light. Thus, of the light that returns to the mirror at the location of the polarizing beam splitter (for example, where the opening normally would be), while the s polarized light may still pass through the polarizing beam splitter and be lost, the p polarized light may instead be reflected towards the detector. This may further increase the amount of return light that is reflected towards the detector as at least a portion of the light that returns to the opening will still be reflected by the polarizing beam splitter instead of merely passing through the opening. Additionally, at least some of the light of the polarization state that the polarizing beam splitter may be configured to transmit may also be reflected in some cases. This may be because, as described above, the polarizing beam splitter may be configured to reflect and/or transmit certain percentages of the light in different polarization states. This may mean that even more light is reflected toward the detectors as a certain percentage of the polarization state that primarily transmits through the polarizing beam splitter may instead reflect from the polarizing beam splitter and towards the detector. For example, if the polarizing beam splitter is configured to transmit 95% of s polarized light, then the remaining 5% of any s polarized return light may still reflect from the polarizing beam splitter and towards the detector instead of 100% of the s polarized light transmitting through the polarizing beam splitter away from the detector. Although the polarizing beam splitter is described above as reflecting p polarized light and transmitting s polarized light, these examples should not be taken as limiting. In some instances, the polarizing beam splitter may be configured to reflect s polarized light and transmit p polarized light, or reflect and/or transmit a percentage of each of p polarized light and s polarized light.

In some embodiments, another method for mitigating the loss of light through the hole in the reflective element may be to reduce the size of the opening to be small enough to minimize the amount of return light that is able to pass through the opening instead of being reflected to the detector, while still allowing most or all of the emitted light from the emitter to pass through the mirror. In some instances, this opening size may be as small as 1 mm, for example. In order to ensure that most or all of the light from the emitter (for example, a laser) passes through this reduced size opening in the mirror, the mirror may be disposed close to the emitter. The distance between the mirror and the emitter may be dependent on the divergence of the light leaving the emitter. Reducing the distance between the mirror and the emitter device may ensure that more of the emitted light passes through the opening because the beam of light emitted from the emitter may naturally be more narrow closer to the emitter (that is, the divergence of the light beam may be relatively small at a short distance from the emitter). Another way to ensure that most or all of the light from the emitter passes through the smaller opening may be to use a lens to focus the emitted light at the opening. The lens may be disposed of in between the emitter device and the opening in the mirror, for example. A positive focal length lens may create a focused spot (for example, a new waist if the transmitter is a laser) at the mirror hole and/or polarizing beam splitter position. The focused spot size may be inversely related to the exiting beam divergence. The distance between the laser transmitter and the mirror hole may depend on the focal length of the lens, and that focal length needs to be chosen to accommodate the source divergence, spot size requirement at the mirror hole, and the exiting beam divergence. Technically this optic could be focusing or collimating, but collimating may require a large hole in the mirror.

Figure 2:
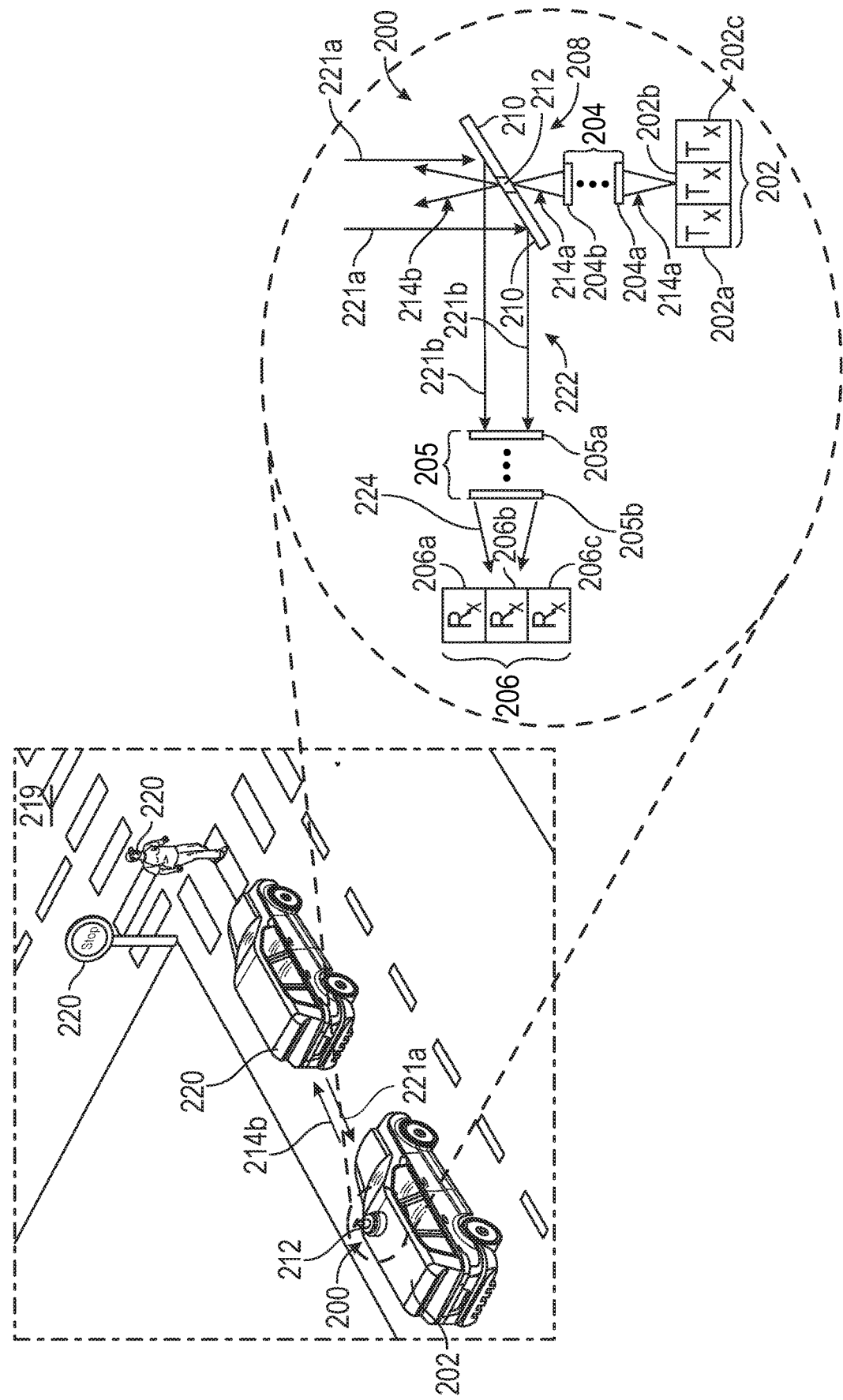
FIG. 2 depicts an example schematic diagram of an optical switch system, in accordance with one or more example embodiments of the disclosure.
Figure 6:
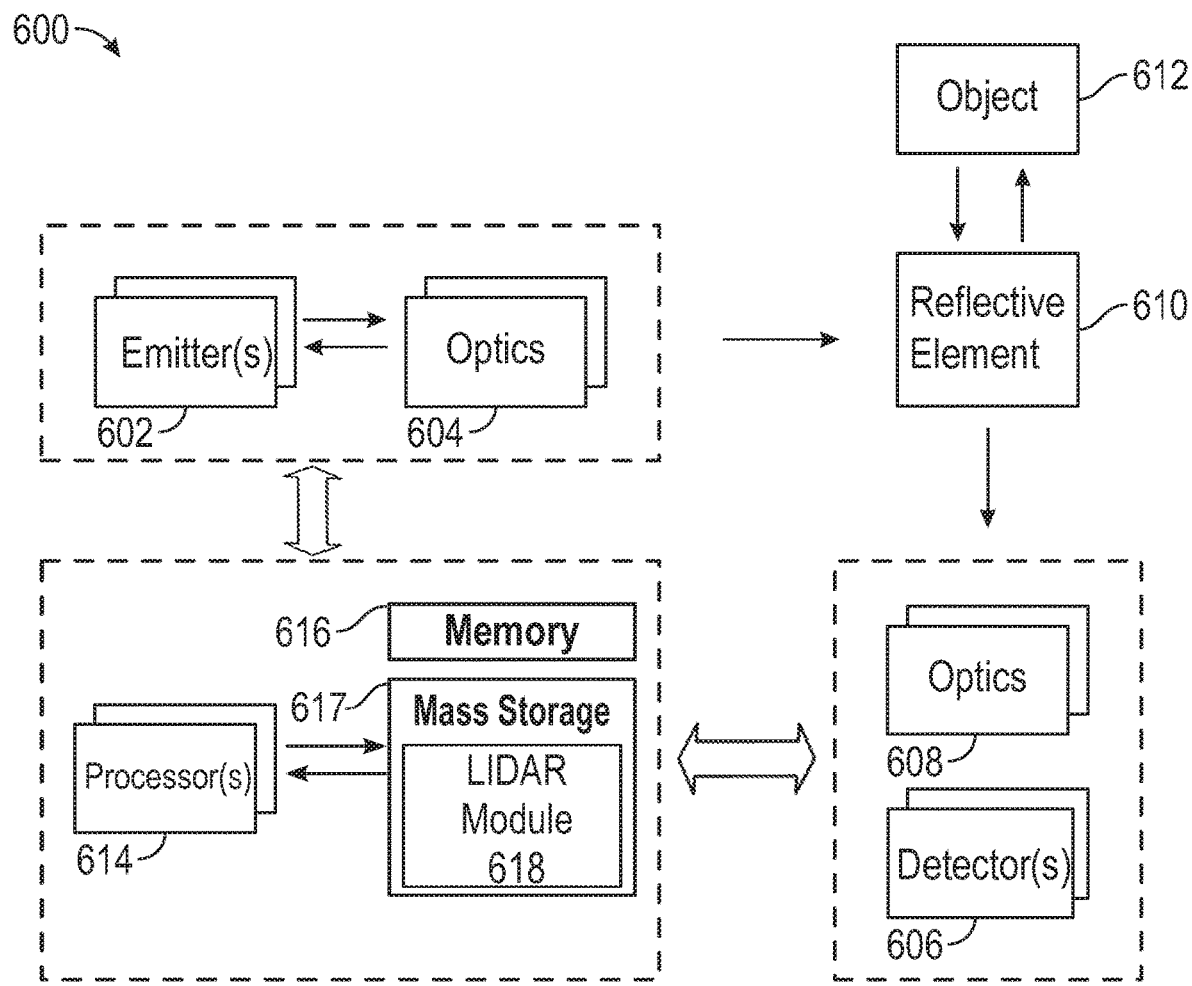
FIG. 6 depicts a schematic illustration of an example LIDAR system architecture, in accordance with one or more example embodiments of the disclosure.

Turning to the figures, FIG. 1 includes a schematic diagram of an example LIDAR system 100 (which may be the same as LIDAR system described with respect to FIG. 2, LIDAR system 600 described with respect to FIG. 6, as well as any other LIDAR system described herein) that may include a reflective element 108 that may serve dual purposes. First, the reflective element 108 may allow emitted light (for example, emitted light 114*a*) to transmit through the reflective element 108 towards the environment 119. Second, the reflective element 108 may also mitigate the amount of return light (for example, return light 121*a*) that may be lost due to the return light transmitting through the reflective element 108 rather than being reflected towards one or more detector devices 106. This reflective element 108 may be described in further detail below. With reference to the elements present in the use case 100, the LIDAR system 101 may include at least one or more emitter devices 102 (for example, emitter device 102*a*, emitter device 102*b*, emitter device 102*c*, and/or any number of additional emitter devices), one or more transmitting optical elements 104 (for example, transmitting optical element 104*a* and/or transmitting optical element 104*b*, and/or any other number of additional transmitting optical elements), one or more reflective elements 108, one or more detector devices 106 (for example, detector device 106*a*, detector device 106*b*, detector device 106*c*, and/or any number of additional detector devices), and/or one or more receiving optical elements 105 (for example, receiving optical element 105*a* and/or receiving optical element 105*b*, and/or any other number of additional receiving optical elements). Hereinafter, reference may be made to elements such as "emitter device," "detector device," "reflective element," "transmit optical element," and/or "receiving optical element," however such references may similarly apply to multiple of such elements as well. In some embodiments, the LIDAR system 100 may be incorporated onto a vehicle 102 and may be used at least to provide range determinations for the vehicle 102. For example, the vehicle 102 may traverse an environment 104 and may use the LIDAR system 100 to determine the relative distance of various objects 106 in the environment 104 relative to the vehicle 102. The reflective element 108 may enhance the ability of the LIDAR system 100 by allowing a maximum amount of light that is transmitted by the LIDAR system 100 towards an object 120 to be received by one or more detectors 110 in the LIDAR system 100 when the light is reflected from the object 120 back towards the LIDAR system 100. It should be noted that although the reflective element 108 may be depicted in FIG. 1 as incorporated onto a vehicle 102, the reflective element 108 may also be implemented in other LIDAR systems other than vehicle LIDAR systems, and may be used outside of the LIDAR context as well.

In some embodiments, an emitter device 102 may be a device used for emitting light (for example, emitted light 114*a*) from the LIDAR system 100 and into the environment 119. For example, the emitter device 102 may be a laser diode. As depicted in FIG. 1, emitted light 114a may be light that is emitted from the emitter device 102 towards the reflective element 108, and emitted light 114b may be the light that has transmitted through the reflective element 108 and into the environment 119. For simplicity sake, reference may be made to "emitted light 114" herein, which may refer to any of emitted light 114a and/or 114b. In some instances, the emitted light 114 may be a continuous waveform, but in other instances the emitted light 114 may be in the form of a series of pulses (reference may be made to "light pulses" herein, but emitted light may also be in the form of a continuous waveform). Depending on the configuration of the emitter device 102, the emitted light 114 may be in a particular polarization state. The example emitter device 102 as described herein may emit s polarized light. However, this polarization state for the emitted light 114 may merely be used for the sake of consistency in describing the operation of the reflective element 108 herein, and emitted light 114 of any other polarization state and/or combination of polarization states may also be applicable. After being emitted from the LIDAR system 100 and into the environment 119, the emitted light 114 may then may reflect from an object 120 in the environment 119 and return to the LIDAR system 100 as return light 121a. Although FIG. 1 may only depict one emitted light 114 being emitted by the emitter device 102, the emitter device 102 may also emit multiple light pulses. In some instances, the emitted light 114 may be emitted at a fixed wavelength falling within a range of 700-1000 nm, however any other wavelength may also be applicable. However, in some instances, the wavelength of the emitted light 114 may also be variable. Additional properties of the emitted light 114 may also be fixed and/or variable. For example, the amplitude of the pulses may be fixed and/or variable as well.

In some embodiments, a detector device 106 may include a photodiode for detecting return light (for example, return light 121b) that has been reflected from an object 120 in the environment 119. The photodiodes may specifically include Avalanche Photodiodes (APDs), which in some instances may operate in Geiger Mode. However, any other type of photodetector may also be used. As depicted in FIG. 1, return light 121a may be light that is returning from the environment 119 and has not yet interacted with the reflective element 108. Return light 121b may be the light that has reflected from the reflective element 108 and towards the detector device 106. For simplicity sake, reference may be made to "return light 121" herein, which may refer to any of return light 121a and/or 121b. The detector device 106 may be arranged in an array so as to create a continuous field of view (FOV) of the LIDAR system. This may include a receiver lens and field stop, where the FOV may be determined by the ratio of the field stop size/focal length for small angles. The functionality of the detector device 106 in capturing return light 121 from the environment 119 may serve to allow the LIDAR system 100 to ascertain information about the object 120 in the environment 119. That is, the LIDAR system 100 may be able to determine information such as the distance of the object 120 from the vehicle 102 and the shape and/or size of the object 120, among other information. In some embodiments, the return light 121 that is reflected from the object 120 in the environment 119 may be of mixed polarization. That is, the return light 121 reflected from the object 120 may be a combination of polarization states rather than the single polarization state of the emitted light 114.

In some embodiments, the reflective element 108 may serve as an optical switch to reflect the return light 121 from the environment 119 towards the detector device 106. That is, the reflective element 108 may be configured to allow emitted light 114 from the emitter device 102 to pass through, while simultaneously being configured to reflect return light 121 coming back from the environment 119 towards the detector device 106. This may be possible through the use of segmented portions of the reflective element 108. For example, the reflective element 108 may include a polarizing beam splitter portion 112 and one or more mirror portions 110. The polarizing beam splitter portion 112 may be located in the path of the light emitted from the emitter device 102. The polarizing beam splitter portion 112 may allow the emitted light 114 to travel through the reflective element 108 and towards the environment 119 of the LIDAR system 101, whereas other portions of the reflective element 108 may not allow light to transmit through (for example, the mirror portions 110). Thus, the mirror portions 110 of the reflective element 108 may be used to reflect any return light 121 received back from the environment 119. Additionally, an edge of the hole in the reflective element 108 (for example, the portion of the reflective element including the polarizing beam splitter portion 112), or the transition from polarizing beam splitter portion 112 to the one or more mirror portions 110 may be used as an aperture to shape or trim the emitted light 114 from the emitter device 102.

As described above, the use of the polarizing beam splitter portion 112 may serve to allow emitted light pulses 114 from the emitter device 102 to be transmitted through the reflective element 108 and into the environment 119. The polarizing beam splitter portion 112 may also, however, serve the purpose of mitigating the amount of return light 121 that is lost (for example, transmitted through the reflective element rather than reflecting towards the detector 106). This may be the case because the polarizing beam splitter portion 112 may be configured to also reflect light of particular polarization states, so the polarizing beam splitter portion 112 may effectively serve as an extension of the one or more mirror portions 110 for those particular type(s) of polarized light. As an example, the polarizing beam splitter may be configured to reflect p polarized light and may be configured to transmit s polarized light. The emitter device 102 of the LIDAR system 101 may emit s polarized light, so the emitted light may pass through the polarizing beam splitter portion 112 and into the environment 119. In some instances, the return light 121 may be mixed polarization, for example, the return light 121 may include both p polarized light and s polarized light. Thus, of the light that returns to the mirror at the location of the polarizing beam splitter portion 112, the p polarized light may be reflected towards the detector device 106, and the s polarized light may pass through the polarizing beam splitter portion 112. This may further increase the amount of return light 121 that is reflected towards the detector device 106 as at least some of the return light 121 will still be reflected instead of merely passing through the reflective element 108 where an opening would normally be for the emitted light (with no polarizing beam splitter). Although the polarizing beam splitter portion 112 is described above as reflecting p polarized light and transmitting s polarized light, these examples should not be taken as limiting, and the associated drawings may merely be illustrative of one potential configuration of the polarizing beam splitter portion 112. In some instances, the polarizing beam splitter portion 112 may be configured to reflect s polarized light and transmit p polarized light, or reflect and/or transmit a percentage of each of p polarized light and s polarized light. Such cases may be applicable when the position of the emitter device 102 and detector devices 106 relative to the polarizing beam splitter portion 112 are switched such that s polarized light emitted from the emitter device 102 may be reflected from the polarizing beam splitter portion 112 and into the environment 119. The configuration of the polarizing beam splitter portion 112 may also depend on the polarization state of the light being emitted from the emitter device 102. For example, the polarization state of this light may not necessarily be s polarized, but may also be p polarized light. In this case, the configuration of the polarizing beam splitter portion may need to account for this so that the light emitted from the emitter device 102 may enter the environment 119.

Furthermore, to mitigate the risk of losing return light 121 through the polarizing beam splitter portion 112 even further, the size of the polarizing beam splitter portion 112 of the reflective element 108 may be small relative to the one or more mirror portions 110 of the reflective element 108. That is, the polarizing beam splitter portion 112 may be only as large as may be required to ensure that most or all of the emitted light 114 emitted from the emitter device 102 is able to pass through the reflective element 108. As one particular example, the polarizing beam splitter portion 112 may be as small as 1 mm wide.

FIG. 2 may depict a schematic diagram of an example LIDAR system 200. The LIDAR system 200 may be similar to LIDAR system 100 and may include similar components. For example, the one or more emitter devices 202 may be the same as the one or more emitter devices 102, the one or more detector device 206 may be the same as the one or more detector devices 106, the reflective element 208 may be the same as reflective element 108, etc. In some instances, the LIDAR system 200 may differ from LIDAR system 100, however, in that it may also include one or more transmit optical elements 204 and one or more receiving optical elements 205 (for simplicity, reference may be made to a transmit optical element 204 or a receiving optical element 205, but any number of transmit optical elements 204 and/or receiving optical elements 205 may similarly apply).

In some embodiments, a transmit optical element 204 may be an element that may be used to alter the light emitted from the emitter device 202 before it enters the environment. For example, the optical element 204 may be a lens, a collimator, or a waveplate. In some instances, the lens may be used to focus the emitter light. The collimator may be used to collimate the emitted light. That is, the collimator may be used to reduce the divergence of the emitter light. The waveplate may be used to alter the polarization state of the emitted light. Any number or combination of different types of optical elements 204, including optical elements not listed herein, may be used in the LIDAR system 200. In some instances, the receiving optical element 205 may be an element that is used to alter the return light traveling towards the detector 206. For example, the receiving optical element 205 may be a lens, a waveplate, or filter such as a bandpass filter, to name a few examples. In some instances, the lens may be used to focus return light on the detector 206. The waveplate may be used to alter the polarization state of the return light. The filter may be used to only allow certain wavelengths of light to reach the detector (for example, a wavelength of light emitted by the emitter 202). Any number or combination of different types of receiving optical elements 205, including optical elements not listed herein, may be used in the LIDAR system 200.

In some embodiments, the operation of the LIDAR system 200 may be described below to provide additional context. The operation of the LIDAR system 200 may begin with the emitter device 202 emitting light. The emitted light 214 may have divergence in one or more directions, and may also be polarized light, for example, s polarized light (but may also be light of any other polarization state, such as p polarized light). The emitted light 214 may travel to a one or more transmitting optical elements 204, such as a first transmitting optical element 204a, which may be a collimator. The collimator may collimate the emitted light 214 to mitigate at least some of the divergence of the emitted light 214. The emitted light 214 may then travel to a second transmitting optical element 204b, which may be a lens used to focus the collimated light into a focused light beam 114c, such as a convex lens. The purpose of focusing the collimated light may be to ensure that most or all of the light is able to pass through a polarizing beam splitter portion 212 of the reflective element 208, which will be described in more detail below. Although the described operations include two particular types of transmitting optical elements 204, any other number or combination of types of transmit optical elements may also be employed. As one non-limiting example, only the collimator or only the focusing lens may be used. Additionally, although the light being output from the transmitting optical elements 204 is described as focused light, this may differ depending on the type of transmitting optical elements 204 that are used. For example, if only a collimator is used, then the light may be collimated but not focused as described above. Furthermore, in some instances no transmitting optical elements 204 may be used and the light pulses emitted from the emitter device 202 may remain unaltered until it reaches the polarizing beam splitter portion 212 of the reflective element 208 as described below. In such instances, the emitter device 202 may be disposed of closer to the reflective element 208 to maximize the amount of light that is able to pass through the reflective element 208. For example, as described above, the divergence of the emitted light 214 may be relatively small closer to the emitter device 202.

In some embodiments, the operations may additionally involve the focused light 214c being transmitted through the reflective element 208. In particular, the focused light 214c may be transmitted through the reflective element 208 at the polarizing beam splitter portion 212 of the reflective element 208. The purpose of the polarizing beam splitter portion 212 may include to transmit one polarization state (for example, s polarized light) and reflect the other (for example, p polarized light) with high efficiency, so the vast majority of the transmitted beam may only be one polarization state (for example, s polarized light). For example, if the emitting device 202 is oriented as predominantly s polarized, and the polarizing beam splitter transmits 99% of s polarization and reflects 99% of p polarization (as an example), the emitted light 214b from the polarizing beam splitter portion 212 may effectively be s polarized. In this scenario, any transmitted p polarization may be residual. In some instances, the emitted light 214b may include one polarization state that may be the linear polarization state of the emitter device 202. The emitted light 214b may then travel into an environment 219 of the LIDAR system 201 until it reflects from an object 220 in the environment 219 of the LIDAR system 201.

In some embodiments, the emitted light 214b may be is reflected from the object 220 in the environment 219 of the LIDAR system 201 and back towards the LIDAR system 201 as return light 221a. The return light 221a may be of mixed polarization as described above. For example, the return light 221a may be s polarized and p polarized. Upon reaching the reflective element 208 of the LIDAR system 201, the return light 221a may reflect from one or more mirror portions 210 of the reflective element 208 as return light 221b towards the detector device 206 (return light 221b may be the same as return light 221a, but may include a different reference number simply for the sake of tracking the location of the return light being referred to). Before reaching the detector device 206, the reflected return light 221 may pass through one or more receiving optical elements 205. For example, a receiving optical element 205 may focus the return light 221 towards the detector device 206. The return light 221 may then be received by the detector device 206. This return light 221 may then be used by the LIDAR system 220 for various purposes, such as range determinations with respect to the object 220, as described above.

Illustrative Apparatus

Figure 3B:
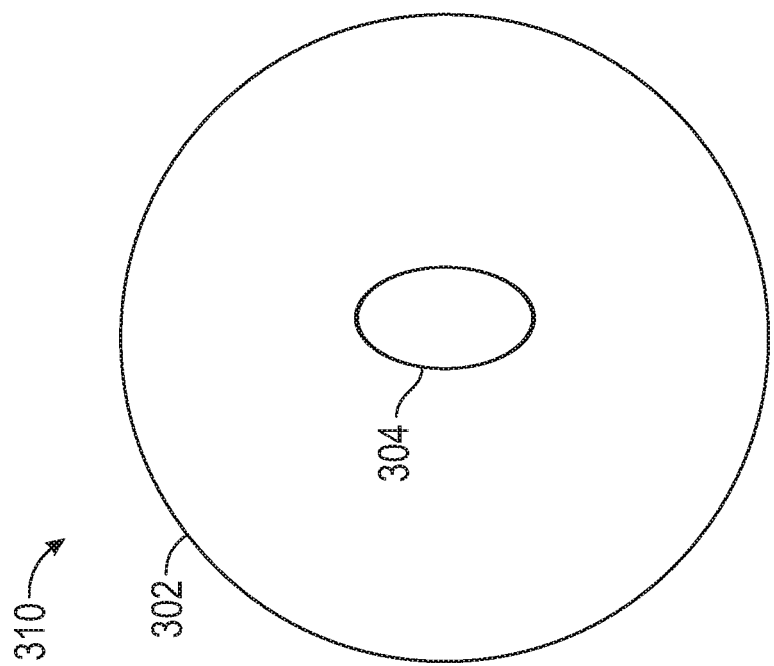
FIGS. 3A-3B depict example configurations of the reflective element, in accordance with one or more example embodiments of the disclosure.
Figure 3A:
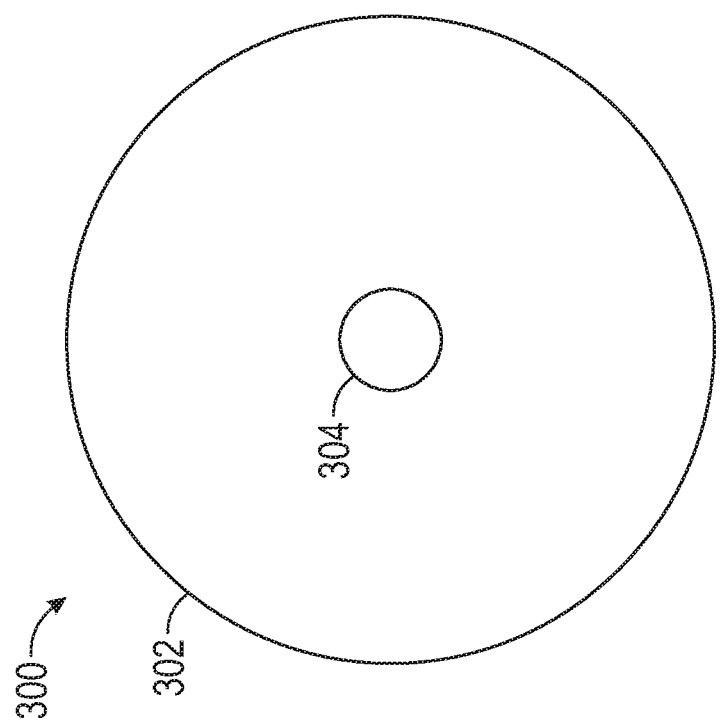

FIGS. 3A and 3B depict example configurations of the polarizing beam splitter portion 304 of the reflective element 302 of the LIDAR system (for example, LIDAR system 100, 200, 600, or any other LIDAR system described herein). FIGS. 3A and 3B may depict the reflective element 302 from a top-down view. As depicted in the figures, the reflective element 302 may be circular in shape, however any other shape of reflective element 302 may also be used. As depicted in FIG. 3A, a first configuration 300 of a reflective element 302 may include a polarizing beam splitter portion 304 that is circular in shape. Additionally, as depicted in FIG. 3B, a second configuration 310 of the reflective element 302 may include the polarizing beam splitter portion 304 in a "slot" shape (for example, a more elliptical shape than the circular shape depicted in FIG. 3A). In some embodiments, the circular shape of the polarizing beam splitter portion 304 of the first configuration 300 may be beneficial in that the surface area of the reflective element 302 that the polarizing beam splitter portion 304 covers may be minimized. The "slot" configuration depicted in FIG. 3B may be beneficial if intermediate focus is elliptical, and may potentially be easier to manufacture due to more tractable masking operations in coating both mirror and beam splitter coatings on the same surface. It should be noted that the first configuration 300 and the second configuration 310 for the reflective element 302 are merely exemplary, and any other configuration may similarly be used. For example, the polarizing beam splitter portion may include a slot that extends from one end of the mirror portion to another end, such that the mirror portion is effectively two mirror portions with the polarizing beam splitter portion in between the two mirror portions.

Figure 4A:
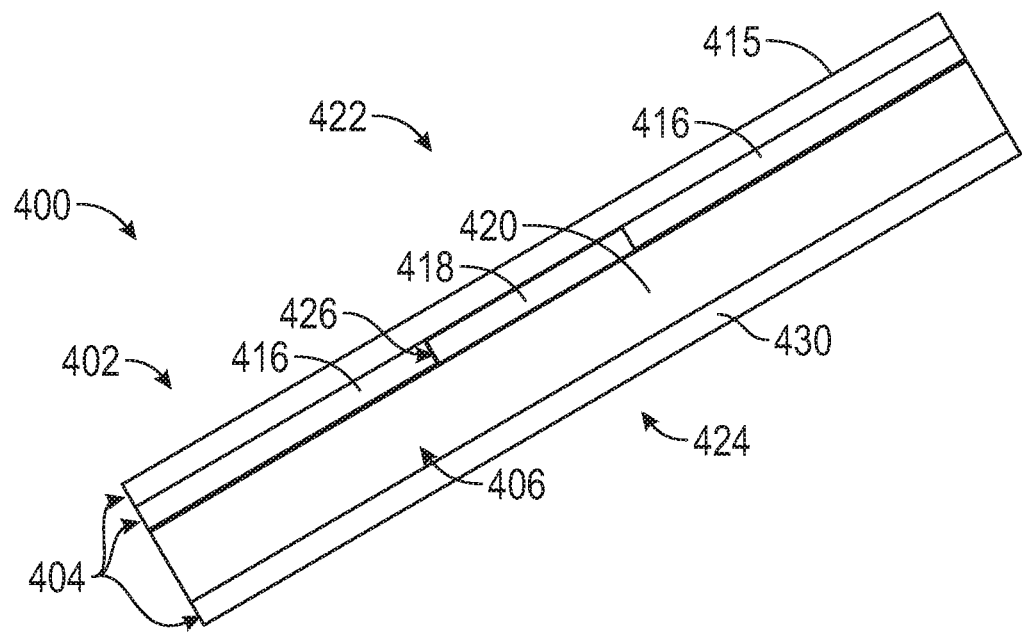
FIGS. 4A-4C depict example configurations of the reflective element, in accordance with one or more example embodiments of the disclosure.
Figure 4B:
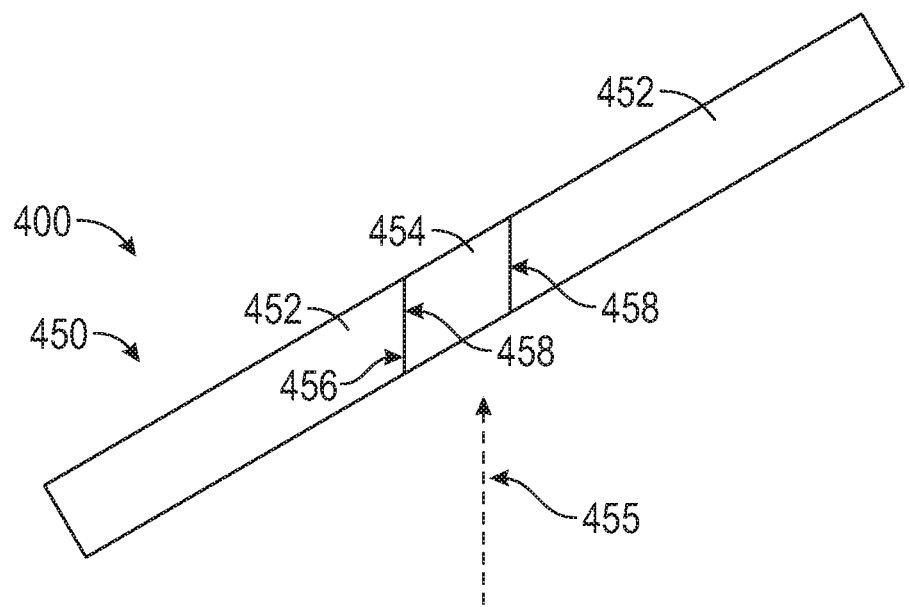

FIGS. 4A and 4B depict cross sectional views of various configurations (for example, first configuration 402 and second configuration 420) of the reflective element 400 of the LIDAR system (for example, LIDAR system 100, 200, 600, or any other LIDAR system described herein). To provide some context, the configurations described with respect to FIGS. 3A-3B may be configurations directed to the shape of an outer surface of the polarizing beam splitter portion. FIGS. 4A-4B may instead be directed to configurations depicting the manner in which the polarizing beam splitter portion (as well as the one or more mirror portions) is implemented into the reflective element. For example, the polarizing beam splitter portion may be a layer disposed on top of a base material or may be a physically separable component that may be placed within the reflective element. Thus, the reflective element 400 may include any combination of the configurations depicted and described with respect FIGS. 3A and 3B and the configurations depicted and described with respect to FIGS. 4A and 4B.

FIG. 4A depicts a first example configuration 402 of a reflective element 400 of the LIDAR system. In some embodiments, the first example configuration 402 may involve applying one or more layers 404 to a base layer 406. That is, the polarizing beam splitter portion 418 and/or the one or more mirror portions 416 may be coatings on a base layer 406 rather than physically separate components. In some instances, the base layer 406 may be constructed from a transparent medium, such as glass, but any other type of suitable material for base layer 406 may be used. In some instances, the polarizing beam splitter portion 418 and the one or more mirror portions 416 may be coated on a first side 422 of the base layer 406. The first side 422 may correspond to the side of the reflective element 400 that may be facing towards the direction of the environment (for example, the side of the reflective element 400 that returns light from the environment may interact with as described in FIGS. 1 and 2). The polarizing beam splitter portion 418 and the one or more mirror portions 416 may be further coated by a protective layer 415 that may serve to protect the polarizing beam splitter portion 418 and the one or more mirror portions 416 from external factors. The base layer 406 may also be coated with an anti-reflection (AR) layer 430 a second side 424 that may be opposite to the first side 442. That is, the AR layer 430 may be coated on the side of the reflective element 400 at which the light pulse from the emitter device arrives. This may help to mitigate any reflections of light off of the second side 424 and may likewise help to maximize the amount of the emitted light that passes through the reflective element 400 and into the environment of the LIDAR system. In some instances, the AR layer 430 may only be applied to portions of the base layer 406 so that the light pulses may still travel through the base layer 406 and the polarizing beam splitter portion 418. The AR layer 430 and polarizing beam splitter portion 418 may be relatively thin (for example, approximately a quarter wavelength of an optical path, but need not be exactly this size) dielectric layers of varying high and low index. These layers may be applied through various techniques, such as vapor deposition. The mirror coatings may comprise a number of materials, including at least metallic materials, such as gold, silver, and aluminum. The application of the mirror coatings and beam splitter coatings on the same layer (top interface of 404 and 406) can be achieved through subsequent coating runs with appropriate sacrificial masking used in the production process.

While FIG. 4A depicts the polarizing beam splitter portion 418 and the one or more mirror portions 416 as constituting a same layer directly on top of the base laser 406, this does not necessarily have to be the case. In some embodiments, for example, the entire first side 422 of the base layer 406 may first be coated with a polarizing beam splitter layer, and then the one or more mirror layer coatings may be applied at the appropriate locations on top of the polarizing beam splitter location (for example, in the same location the one or more mirror portions 416 are shown in FIG. 4A). That is, instead of being coated separately on the base layer 406, the one or more mirror layer coatings may be applied on top of the polarizing beam splitter layer that covers the entire first side 422 of the base layer 406. Likewise, it should be noted that any other combination of types of layers and location of layers may be applicable. Additionally, any of such layers may also be applied to either side of the base layer 406 (for example, the first side 422 and/or the second side 424). For example, in some embodiments the polarizing beam splitter layer may be applied to both the first side 422 and the second side 424.

That is, the particular example first configuration 402 should not be taken as limiting as to the manner in which coatings may be applied to a base layer 406.

FIG. 4B depicts a second example configuration 450 of a reflective element 400. In the second example configuration 450 the one or more mirror portions 452 and the polarizing beam splitter portion 454 of the reflective element 400 may be individual components. That is, the polarizing beam splitter portion 454 and the one or more mirror portions 452 may be separately manufactured components that may be combined to form the reflective element 400. In one example, the mirror may be manufactured with an aperture or hole in the center, and the polarizing beam splitter portion 454 may be inserted into the aperture.

Figure 4C:
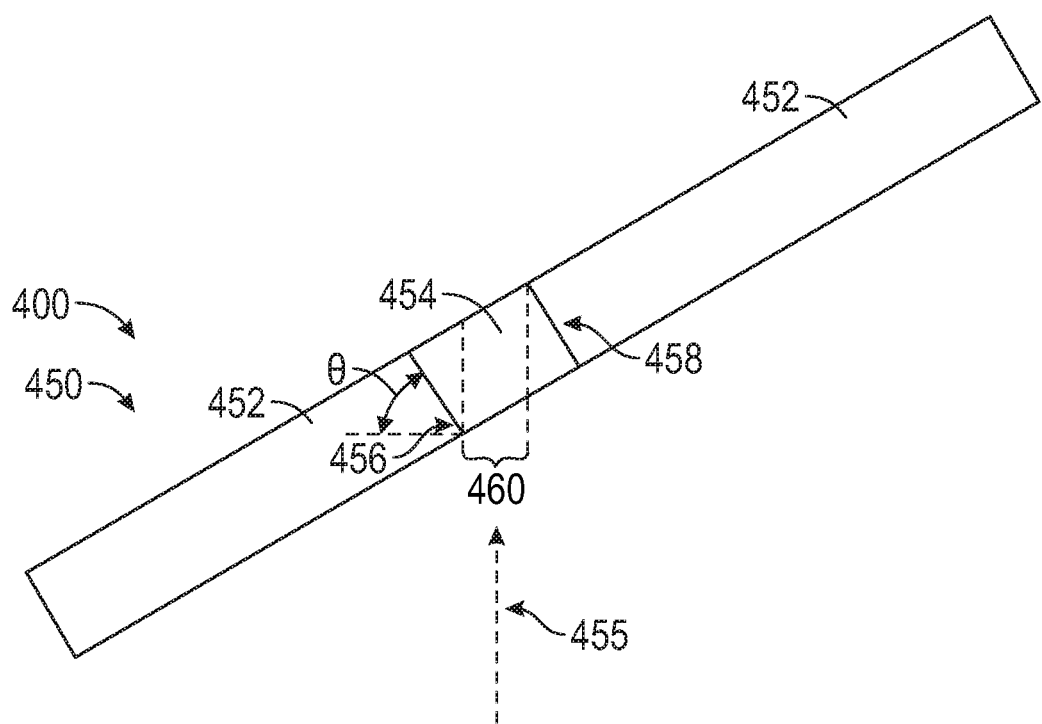

In some embodiments, the one or more mirror portions 452 and the polarizing beam splitter portion 454 may be configured at an angle that is not at 90 degrees relative to the mirror portions 452, for example, as shown at 456 (it should be noted that the one or more mirror portions and/or the polarizing beam splitter portion may be configured at an angle in any other configuration described herein, such as the first configuration 402 described with respect to FIG. 4A). This may be the case so that the sides 458 of the polarizing beam splitter portion 454 may be parallel with the path of a light pulse being emitted from an emitter device of the LIDAR system (for example, as shown at 455) as described herein. This may allow the polarizing beam splitter portion 454 to maximize the amount of emitted light that is transmitted through the polarizing beam splitter portion 454 for a given polarizing beam splitter portion 454 size. This concept may be visually depicted further in FIG. 4C. For example, as shown in FIG. 4C, the angle shown at 456 is changed to 90 degrees between the polarizing beam splitter portion 454 sides and the one or more mirror portions 452 sides. When this is the case, the light pulse 455 only has an area 460 through which it may travel without colliding with a side 458 of the polarizing beam splitter portion 454. This is because the light pulse shown at 455 may not be arriving at the reflective element 400 perpendicular to the reflective element 400. Instead, the reflective element 400 may be oriented in a tilted configuration so that return light from the environment will be reflected towards a detector device of the LIDAR system, instead of simply being reflected right back out into the environment. While it may be desirable to manufacture the polarizing beam splitter portion 452 to include sides that are not at 90 degree angles for the reasons described above, there may also be benefits to manufacturing the polarizing beam splitter portion 452 to include sides at 90 degree angles. For example, to provide ease of manufacturing as producing polarizing beam splitters with sides at 90 degree angles may be simpler than manufacturing the polarizing beam splitter with sides at non 90 degree angles.

Illustrative Processes

Figure 5:
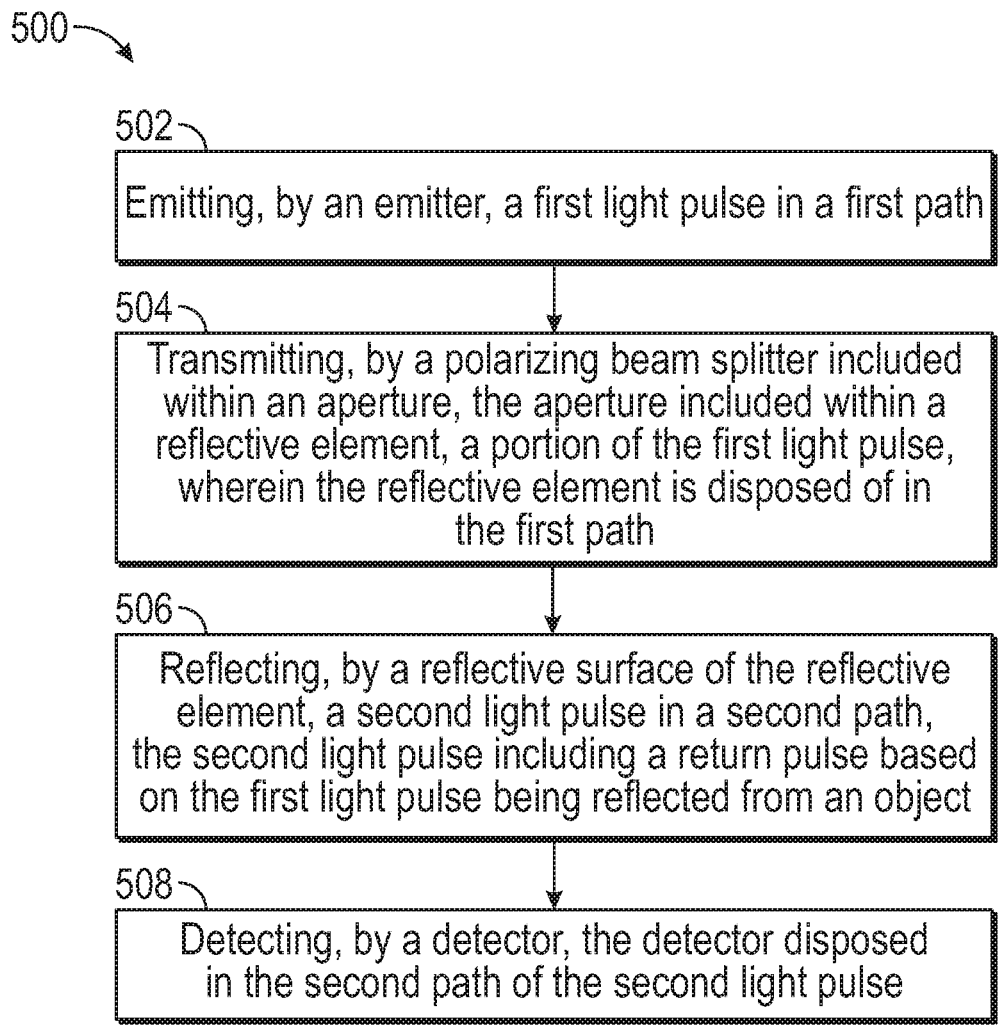
FIG. 5 depicts an example method in accordance with one or more example embodiments of the disclosure.

FIG. 5 is an example method 500 in accordance with one or more example embodiments of the disclosure.

At block 502 of the method 500 in FIG. 5, the method may include emitting, by an emitter, a first light pulse in a first path. The emitter may be, for example, the emitter device 102 described with respect to FIG. 1 or the emitter device 202 described with respect to FIG. 2, or any other emitter device described herein. In some embodiments, the emitter may be a laser diode. In some instances, multiple emitters may also be used to emit multiple light pulses at the same time or in staggered time intervals may also be used. In some instances, different lasers may emit light pulses in different directions. The properties of the emitted light pulses, such as wavelength and amplitude, among other properties, may remain fixed in each successive light emission. For example, the wavelength of the light pulse emitted from the laser may be in the range of 700-1000 nm. However, these properties may also be variable as well. For example, a laser may emit one light pulse at a first amplitude, and may emit a subsequent light pulse at a greater amplitude. In some embodiments, the laser may be a laser diode of a LIDAR system, where the vehicle LIDAR system may be used for detecting objects in an environment of the vehicle.

In some embodiments, one or more transmitting optical elements may also be disposed of in the first path. For example, the one or more transmitting optical elements may include a collimator and/or a focusing lens as described above. However, any other types and/or combinations of transmitting optical elements may be used. Additionally, in some instances only one transmitting optical elements or even no transmitting optical elements may be used. The transmitting optical elements may be used to direct the light towards a particular portion of a reflective element that is also disposed of in the first path (for example, towards the polarizing beam splitter portion of the reflective element as described below with respect to Block 504).

Block 504 of the method 500 may include transmitting, by a polarizing beam splitter in the first path and aligned with an aperture of a reflective element, a portion of the first light pulse, wherein the reflective element is disposed of in the first path. In some embodiments, the reflective element may be an element that is capable of allowing the first light pulse to pass through and into the environment and is also simultaneously capable of reflecting return light from the environment in the direction of a detector device. As described above, the reflective element may be a mirror that is used to reflect return light from the environment towards the detector device. However, in such configurations, the mirror may also be disposed of in the path of the light being emitted from the emitter device, and may block the emitted light from reaching the environment. Thus, the polarizing beam splitter may be included in the reflective element to allow the emitted light to pass through the mirror and into the environment, while still having sufficient mirror surface area remaining to reflect most of the return light to the detector. The polarizing beam splitter also has the added benefit of reflecting at least some of the return light that lands at the polarizing beam splitter. If there were just an opening at the location of the polarizing beam splitter, this return light would normally be completely lost (for example, would not reflect to the detector device and be detected by the LIDAR system).

In some embodiments, the aperture included within the reflective element may be an opening, such that the polarizing beam splitter may be a separate component that is inserted into the opening (for example, as described in configuration 420 with respect to FIG. 4B). In some embodiments, the aperture may simply refer to an area of the reflective element at which the polarizing beam splitter is located. For example, the polarizing beam splitter applied as a coating to a base layer of the reflective element (as described in configuration 400 with respect to FIG. 4A). In such embodiments, the aperture may simply refer to the location of the polarizing beam splitter coating on the base layer of the reflective element.

In some embodiments, the polarizing beam splitter may allow the light emitted from the emitter to pass through because it may allow light of particular polarization to pass, while reflecting light of other polarizations. As an example, the polarizing beam splitter may be configured to reflect p polarized light and may be configured to transmit s polarized. The emitter of the LIDAR system may emit s polarized light, so the emitted light may pass through the polarizing beam splitter and into the environment. In some instances, the return light may be mixed polarization, for example, the return light may include both p polarized light and s polarized light. Thus, of the light that returns to the mirror at the location of the polarizing beam splitter, the p polarized light may be reflected towards the detector, and the s polarized light may pass through the polarizing beam splitter and be lost. This may further increase the amount of return light that is reflected towards the detector as at least some of the light that returns to the polarizing beam splitter will still be reflected instead of merely passing through the mirror where the opening would normally be. Although the polarizing beam splitter is described above as reflecting p polarized light and transmitting s polarized light, in some embodiments, however, the polarizing beam splitter may also be adjusted to allow for different types of polarized light to reflect and/or transmit. Adjusting the polarizing beam splitter may also allow for different amounts of those types of polarized light to reflect and/or transmit. This adjustment may include changing an angle of the polarizing beam splitter relative to a normal, but other adjustments may be possible as well. For example, at one angle the reflectivity of the p polarized light may be 80%, but at another angle it may be 0%. These adjustments may be used to further maximize the amount of return light that is reflected to the detector instead of transmitted through the polarizing beam splitter.

Block 506 of the method 500 may include reflecting, by a reflective surface of the reflective element, a second light pulse in a second path, the second light pulse including a return pulse based on the first light pulse being reflected from an object. In some embodiments, the reflective surface may be the one or more mirror portions of the reflective element s described herein. The reflective surface may also include the surface of the polarizing beam splitter for the types of polarized light the polarizing beam splitter is configured to reflect. The return pulse, as described above, may be light that has been reflected from an object back to the LIDAR system. Additionally, the second path may be the same as the first path, but in an opposite direction. For example, the first path may originate from the emitter and point in the direction of the reflective element, and the second path may originate from the object and point in the direction of the reflective element. However, the return light may be of mixed polarization, and some or all of the return light may be offset from the first path. That is, the first path may land directly on the polarizing beam splitter, but the return light following the second path may primarily land on the one or more mirror portions of the reflective element. The first path and the second path, however, may generally be the same in that they both end at the reflective element.

Block 508 of the method 500 may include detecting, by a detector, the second light pulse, the detector disposed in the second path of the second light pulse. The detector may include, for example, a photodetector for detecting photons (the return light). In particular, the photodetector may include an Avalanche Photodiode, which may operate in Geiger Mode. However, other types of photodetectors may also be used to serve a similar purpose. Additionally, multiple detectors may be employed as well.

The operations described and depicted in the illustrative process flow of FIG. 5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 5 may be performed.

Example Lidar System

FIG. 6 illustrates an example LIDAR system 600, in accordance with one or more embodiments of this disclosure. The LIDAR system 600 may be representative of any number of elements described herein, such as the LIDAR system 100 described with respect to FIG. 1, the LIDAR system 200 described with respect to FIG. 2, as well as any other LIDAR systems described herein. The LIDAR system 600 may include at least an emitter portion 601, a detector portion 605, and a computing portion 613. In some instances, the LIDAR system may also include a reflective element 610.

In some embodiments, the emitter portion 601 may include at least one or more emitter(s) 602 (for simplicity, reference may be made hereinafter to "an emitter," but multiple emitters could be equally as applicable) and/or one or more optical element(s) 604. An emitter 602 may be a device that is capable of emitting light into the environment. Once the light is in the environment, it may travel towards an object 612. The light may then reflect from the object and return towards the LIDAR system 600 and be detected by the detector portion 605 of the LIDAR system 600 as may be described below. For example, the emitter 602 may be a laser diode as described above. The emitter 602 may be capable of emitting light in a continuous waveform or as a series of pulses. An optical element 604 may be an element that may be used to alter the light emitted from the emitter 602 before it enters the environment. For example, the optical element 604 may be a lens, a collimator, or a waveplate. In some instances, the lens may be used to focus the emitter light. The collimator may be used to collimate the emitted light. That is, the collimator may be used to reduce the divergence of the emitter light. The waveplate may be used to alter the polarization state of the emitted light. Any number or combination of different types of optical elements 604, including optical elements not listed herein, may be used in the LIDAR system 600.

In some embodiments, the detector portion 605 may include at least one or more detector(s) 606 (for simplicity, reference may be made hereinafter to "a detector," but multiple detectors could be equally as applicable) and/or one or more optical elements 608. The detector may be a device that is capable of detecting return light from the environment (for example, light that has been emitted by the LIDAR system 600 and reflected by an object 612). For example, the detectors may be photodiodes. The photodiodes may specifically include Avalanche Photodiodes (APDs), which in some instances may operate in Geiger Mode. However, any other type of photodetector may also be used. The functionality of the detector 606 in capturing return light from the environment may serve to allow the LIDAR system 100 to ascertain information about the object 612 in the environment. That is, the LIDAR system 100 may be able to determine information such as the distance of the object from the LIDAR system 100 and the shape and/or size of the object 612, among other information. The optical element 608 may be an element that is used to alter the return light traveling towards the detector 606. For example, the optical element 608 may be a lens, a waveplate, or filter such as a bandpass filter. In some instances, the lens may be used to focus return light on the detector 606. The waveplate may be used to alter the polarization state of the return light. The filter may be used to only allow certain wavelengths of light to reach the detector (for example, a wavelength of light emitted by the emitter 602). Any number or combination of different types of optical elements 608, including optical elements not listed herein, may be used in the LIDAR system 600.

In some embodiments, the computing portion may include one or more processor(s) 614 and memory 616. The processor 614 may execute instructions that are stored in one or more memory devices (referred to as memory 616). The instructions can be, for instance, instructions for implementing functionality described as being carried out by one or more modules and systems disclosed above or instructions for implementing one or more of the methods disclosed above. The processor(s) 614 can be embodied in, for example, a CPU, multiple CPUs, a GPU, multiple GPUs, a TPU, multiple TPUs, a multi-core processor, a combination thereof, and the like. In some embodiments, the processor(s) 614 can be arranged in a single processing device. In other embodiments, the processor(s) 614 can be distributed across two or more processing devices (for example, multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (for example, manufactured) to perform the functions described herein.

The processor(s) 614 can access the memory 616 by means of a communication architecture (for example, a system bus). The communication architecture may be suitable for the particular arrangement (localized or distributed) and type of the processor(s) 614. In some embodiments, the communication architecture 606 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 616 also can retain data.

Each computing device 600 also can include mass storage 617 that is accessible by the processor(s) 614 by means of the communication architecture 606. The mass storage 617 can include machine-accessible instructions (for example, computer-readable instructions and/or computer-executable instructions). In some embodiments, the machine-accessible instructions may be encoded in the mass storage 617 and can be arranged in components that can be built (for example, linked and compiled) and retained in computer-executable form in the mass storage 617 or in one or more other machine-accessible non-transitory storage media included in the computing device 600. Such components can embody, or can constitute, one or many of the various modules disclosed herein. Such modules are illustrated as including a LIDAR module 618. The LIDAR module 618 including computer-executable instructions, code, or the like that responsive to execution by one or more of the processor(s) 614 may perform functions that may include execution of any other methods and/or processes described herein.

In some embodiments, the reflective element 610 may be the same as reflective element 108, reflective element 208, reflective element 400, or any other reflective element described herein. That is, the reflective element 610 may be used for multiple purposes. First, the reflective element 610 may allow emitted light to transmit through the reflective element 610 towards the environment. Second, the reflective element 610 may also mitigate the amount of return light that may be lost due to the return light transmitting through the reflective element 610 rather than being reflected towards one or more detector(s) 606.

It should further be appreciated that the LIDAR system 600 may include alternate and/or additional hardware, software, or firmware components beyond those described or depicted without departing from the scope of the disclosure. More particularly, it should be appreciated that software, firmware, or hardware components depicted as forming part of the computing device 600 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (for example, data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (for example, data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (for example, computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

That which is claimed is:

1. A system, comprising:
an emitter configured to emit a first light pulse in a first path;
a reflective element disposed in the first path of the first light pulse, the reflective element comprising:
a polarizing beam splitter in the first path and aligned with an aperture of the reflective element, the polarizing beam splitter configured to pass a portion of the first light pulse;
a reflective surface configured to reflect a second light pulse in a second path, the second light pulse including a return pulse based on the first light pulse being reflected from an object;
an anti-reflection layer on a first surface of the reflective surface, the first surface facing the emitter; and
a detector, the detector disposed in the second path of the second light pulse,
wherein a size of the polarizing beam splitter is smaller than a size of the reflective surface,
wherein a shape of the reflective element has a circular shape,
wherein a shape of the aperture is different from the shape of the reflective element, and
wherein at least one of the polarizing beam splitter and the anti-reflection layer is a coating on a base layer of the reflective element.

2. The system of claim 1, wherein the polarizing beam splitter is further configured to reflect at least a first portion of the return pulse of a first polarization towards the detector, and transmit a second portion of the return pulse of a second polarization.

3. The system of claim 1, further comprising:
a first lens disposed between the emitter and reflective element in the first path of the first light pulse; and
a second lens disposed between the reflective element and the detector in the second path of the second light pulse.

4. The system of claim 1, wherein the polarizing beam splitter is at least partially disposed in the aperture.

5. The system of claim 1, wherein the reflective surface comprises a layer of reflective material disposed on a first surface of the reflective element, the layer of reflective material exposing a portion of the polarizing beam splitter approximate the aperture.

6. The system of claim 1, wherein the shape of the aperture defined by the reflective element is oval.

7. The system of claim 6, wherein a wall of the reflective element defining the aperture is parallel to the first path and perpendicular to the second path, and
wherein an outer surface of the reflective element has a slope between the first path and the second path.

8. The system of claim 1, wherein a diameter of the aperture is approximately a size of a width of the first light pulse.

9. A reflective apparatus for an optical system, comprising:
a planar structure having a first surface and a substantially parallel second surface, the planar structure defining an aperture, wherein the aperture extends from the first surface to the second surface and is in a first path of a first light pulse; and
a polarizing beam splitter disposed in the aperture, the polarizing beam splitter configured to pass a portion of the first light pulse,
wherein the first surface includes a reflective surface configured to reflect a second light pulse in a second path, the second light pulse including a return pulse based on the first light pulse being reflected from an object,
wherein the second surface includes an anti-reflection layer,
wherein a size of the polarizing beam splitter is smaller than a size of the reflective surface,
wherein a shape of the planar structure has a circular shape,
wherein a shape of the aperture is different from the shape of the planar structure, and
wherein at least one of the polarizing beam splitter and the anti-reflection layer is a coating on a base layer of the reflective element.

10. The apparatus of claim 9, wherein the polarizing beam splitter is further configured to reflect at least a first portion of the return pulse of a first polarization towards a detector of the optical system, and transmit a second portion of the return pulse of a second polarization.

11. The apparatus of claim 9, wherein the reflective surface is on the base layer.

12. The apparatus of claim 9, wherein the shape of the aperture defined by the reflective apparatus is oval.

13. The apparatus of claim 12, wherein a wall of the reflective apparatus defining the aperture is parallel to the first path and perpendicular to the second path, and
wherein an outer surface of the reflective apparatus has a slope between the first path and the second path.

14. The apparatus of claim 9, wherein a width of the aperture is approximately a size of the width of the first light pulse.

15. A method comprising:
emitting, by an emitter, a first light pulse in a first path;
transmitting, by a polarizing beam splitter in the first path and aligned with an aperture of a reflective element, a portion of the first light pulse, wherein the reflective element is disposed of in the first path;
reflecting, by a reflective surface of the reflective element, a second light pulse in a second path, the second light pulse including a return pulse based on the first light pulse being reflected from an object, wherein a size of the polarizing beam splitter is smaller than a size of the reflective surface;

detecting, by a detector, the second light pulse, the detector disposed in the second path of the second light pulse; and providing an anti-reflection layer opposite the reflective surface, wherein a shape of the reflective element has a circular shape, wherein a shape of the aperture is different from the shape of the reflective element, and wherein at least one of the polarizing beam splitter and the anti-reflection layer is a coating on a base layer of the reflective element.

16. The method of claim 15, wherein the polarizing beam splitter is further configured to reflect at least a first portion of the return pulse of a first polarization towards the detector, and transmit a second portion of the return pulse of a second polarization.

17. The method of claim 15, wherein the polarizing beam splitter is disposed in the aperture of the reflective surface or the polarizing beam splitter and reflective surface are one or more layers of material disposed on the reflective element.

18. The method of claim 15, wherein the aperture defined by the reflective element is oval.

19. The method of claim 18, wherein a wall of the reflective element defining the aperture is parallel to the first path and perpendicular to the second path, and wherein an outer surface of the reflective element has a slope between the first path and the second path.

20. The system of claim 1, wherein the anti-reflection layer is disposed on the base layer.

* * * * *